United States Patent [19]

Watanabe

[11] Patent Number: 5,765,051
[45] Date of Patent: Jun. 9, 1998

[54] FOCUS DETECTION DEVICE AND METHOD

[75] Inventor: Toshimi Watanabe, Yokohama, Japan

[73] Assignee: Nikon Corporation, Tokyo, Japan

[21] Appl. No.: 824,265

[22] Filed: Mar. 26, 1997

Related U.S. Application Data

[63] Continuation of Ser. No. 494,543, Jun. 26, 1995, abandoned.

[30] Foreign Application Priority Data

Sep. 7, 1994 [JP] Japan .................. 6-214121

[51] Int. Cl.$^6$ .................. G03B 13/36; G03B 3/00
[52] U.S. Cl. .................. 396/87; 396/85; 396/86;
396/81; 396/104; 396/135; 396/95; 250/201.2
[58] Field of Search .................. 396/80–82, 85–87,
396/95, 104, 135; 250/201.2

[56] References Cited

U.S. PATENT DOCUMENTS

| | | | |
|---|---|---|---|
| 4,967,224 | 10/1990 | Hamada et al. | 354/402 |
| 4,969,003 | 11/1990 | Ohnuki et al. | 354/402 |
| 5,005,040 | 4/1991 | Norita et al. | 354/402 |
| 5,065,175 | 11/1991 | Suzuki et al. | 354/286 |
| 5,079,581 | 1/1992 | Kadohara et al. | 354/402 |
| 5,179,407 | 1/1993 | Kusaka et al. | 354/402 |
| 5,208,625 | 5/1993 | Suekane | 354/402 |
| 5,448,051 | 9/1995 | Yamano | 354/402 |
| 5,448,329 | 9/1995 | Nakata | 354/402 |

Primary Examiner—Howard B. Blankenship
Assistant Examiner—Michael Dalakis
Attorney, Agent, or Firm—Oliff & Berridge, P.L.C.

[57] ABSTRACT

A focus detection device and method permits the shooting lens to follow the movement of the photographic object without a focussing delay due to the calculation time and the movement of the object. The system includes a camera, a shooting lens, a focus detection device for detecting a desired focussing position of the shooting lens for an object, and a communications circuit. The lens includes a shooting lens driving circuit moving the shooting lens to focus, a shooting lens driving control circuit that controls the shooting lens driving circuit, a monitoring circuit that monitors the shooting lens movement by the shooting lens driving circuit, and a shooting lens data memory circuit that stores camera data. The camera includes a focal point detection circuit detecting a position of the shooting lens that matches the desired focussing position, a delay amount correction circuit updating the control amount of the amount calculation circuit to an updated control amount as a result of a delay in calculating the shooting lens control amount, and a shooting lens control amount calculation circuit calculating a control amount to drive the shooting lens to the desired focussing state, the control amount based on the focal point detection circuit detecting when the focussing position the shooting lens matches the desired focussing position and the shooting lens movement. The communications circuit communicates the lens to the with the camera. Focussing is accomplished by transmitting the updated control amount to the shooting lens and moving the shooting lens accordingly.

13 Claims, 13 Drawing Sheets

FOCUS DETECTION DEVICE AND METHOD

This is a Continuation of application Ser. No. 08/494,543 filed Jun. 26, 1995 now abandoned.

BACKGROUND OF THE INVENTION

1. Field of the Invention

The invention relates to a focus detection device and method of focus detection. The focus detection device permits the shooting lens to follow the movement of the photographic object without a focussing delay due to a calculation time and the movement of the object.

2. Description of Related Art

Cameras including a shooting lens and a focus detection device are known. A focal point detection signal is sent from the focus detection device to the shooting lens for focussing the lens. Conventional control systems use two types of focussing methods, namely position control and speed control.

An example of the position control focussing method is shown in FIG. 3, which is a graph relating the lens position to time based on the lens forwarding amount. Data corresponding to the defocussing amount DP(DF), or shooting lens forwarding amount, is sent to the shooting lens from the camera. The shooting lens focussing optical system then moves to the indicated shooting lens position from the starting position based on the defocussing amount. In the position control focussing method, a shooting lens driving target position (line A) is constant and is indicative of the shooting lens position at all times during movement. However, the shooting lens position is not determined as a function of time.

An example of the speed control focussing method is shown in FIG. 4, which is a graph relating the lens position to time based on the lens forwarding amount and the speed control. The focussing data corresponding to the amount of change in the shooting lens driving target position, which is determined by a defocussing amount at a standard time and the elapsed time, is sent to the shooting lens of the camera. The amount of change indicates movement of the shooting lens to the indicated shooting lens position. With the speed control focussing method, unlike the position control focussing method, the shooting lens driving target position (line B) changes as a function of time.

In the position control focussing method, no delay problems are evident, since the method does not depend upon time. However, in the speed control focussing method, delay problems occur because the target position consistently changes as a function of time.

FIG. 2 is a graph relating the lens forwarding amount to time. FIG. 2 illustrates the problems encountered by conventional position control devices and methods. As shown in FIG. 2, at any time tx, there is an error between the shooting lens position and the target position. Even if sufficient time period has elapsed since driving the shooting lens was initiated, the steady state delay may be a non-zero delay amount or offset amount EP. The offset amount EP is usually kept small by the operation of the shooting lens focussing device. However, due to environmental changes in, for example, temperature, humidity, power source voltage, and the position of the shooting lens, the offset amount EP may, in some instances become excessive.

SUMMARY OF THE INVENTION

The invention provides a camera system including a shooting lens having a shooting lens driving circuit that moves the lens to accomplish focussing a shooting lens driving control circuit controls the shooting lens driving circuit, and a shooting lens data memory circuit stores the data relating to focussing. A communications circuit connects the shooting lens driving circuit, the shooting lens driving control circuit, and the shooting lens data memory circuit to circuits of the camera. The camera includes a focus point detection circuit for detecting the focus matching state of the shooting lens. A monitoring circuit monitors the shooting lens movement by the shooting lens driving circuit. A shooting lens control amount calculation circuit calculates a control amount for driving the shooting lens based upon the results from the focal point detection circuit and the monitoring circuit.

The actual focussing of the shooting lens is accomplished by indicating the calculated control amount to the shooting lens via the communications circuit. A delay amount correction circuit in the communications circuit corrects the control amount of the shooting lens control amount calculation circuit to account for any delay.

The camera system also monitors the amount of delay in the shooting lens movement when responding to the indicated control amount. The camera system is structured so the indicated control amount is corrected, enabling shooting lens control to be accomplished without a shift in the focussing of the shooting lens.

The invention overcomes problems associated with conventional position control focussing devices and methods. The focussing control of the shooting lens follows the movement of photograph object without any delay.

BRIEF DESCRIPTION OF THE DRAWINGS

Embodiments of the invention will be described in detail with reference to the following drawings in which like reference numerals refer to like elements and wherein.

DETAILED DESCRIPTION OF PREFERRED EMBODIMENTS

Figure 1:
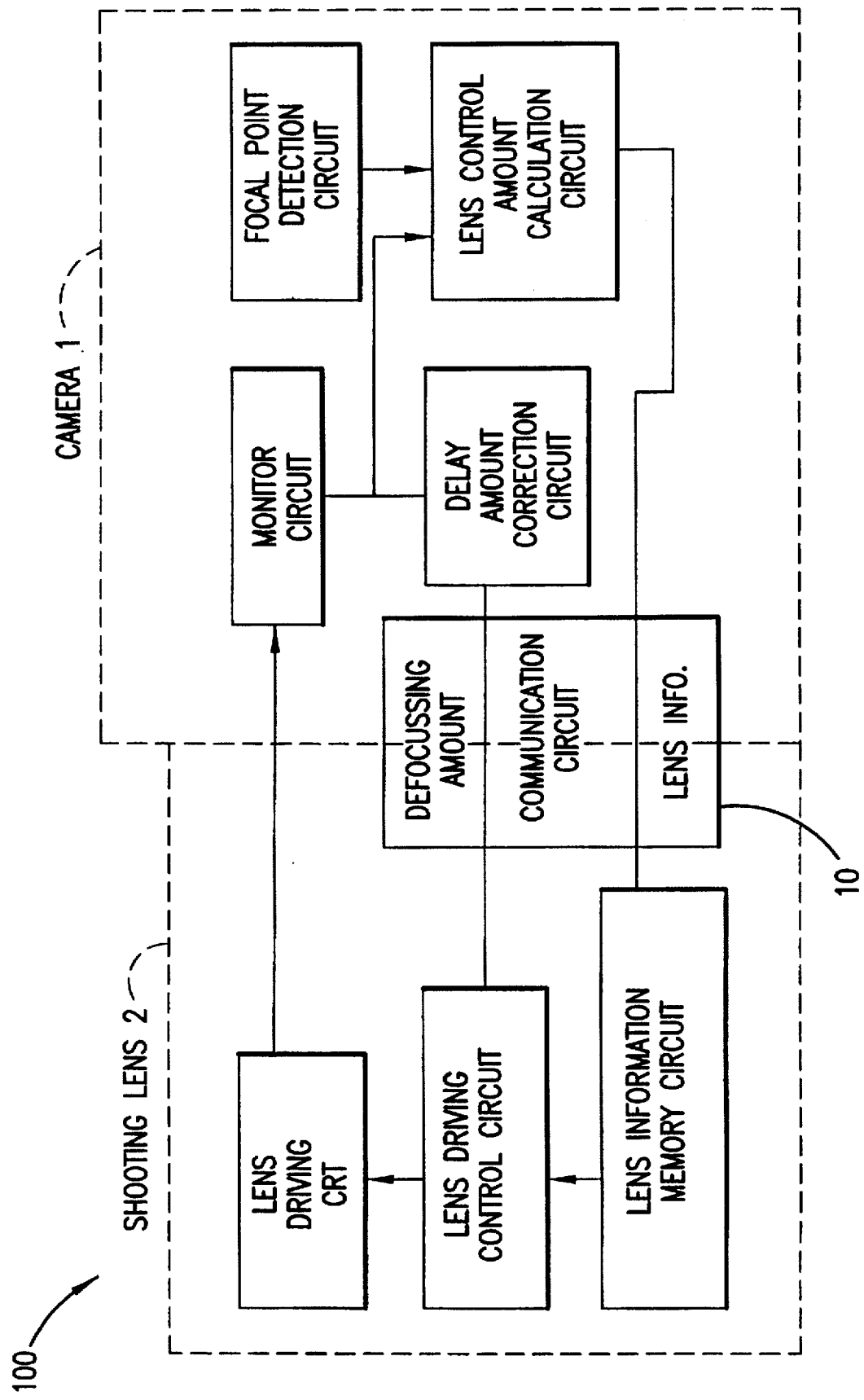
FIG. 1 is a schematic block diagram of the focus detection device of the invention.

As shown in FIG. 1, a camera system 1 includes a shooting lens barrel 2, a camera 1, and a communications circuit 10 connecting the circuitry of the shooting lens barrel 2 to the circuitry of the camera 1. The communications circuit 10 transmits information, such as a defocus amount and lens information between the camera 1 and the shooting lens barrel 2. The communications circuit 10 also transfers information, between the circuits of the shooting lens barrel 2 and camera 1 for focussing the shooting lens barrel 2.

The camera 1 includes a monitor circuit, a focal point detection circuit, a delay amount correction circuit and a lens control amount calculation circuit. The shooting lens barrel 2 includes a lens driving circuit, a lens driving control circuit and a lens information memory circuit. The communication circuit 10 permits lens information and a defocussing amount to be communcicated between the camera 1 and the shooting lens barrel 2.

Figure 5:
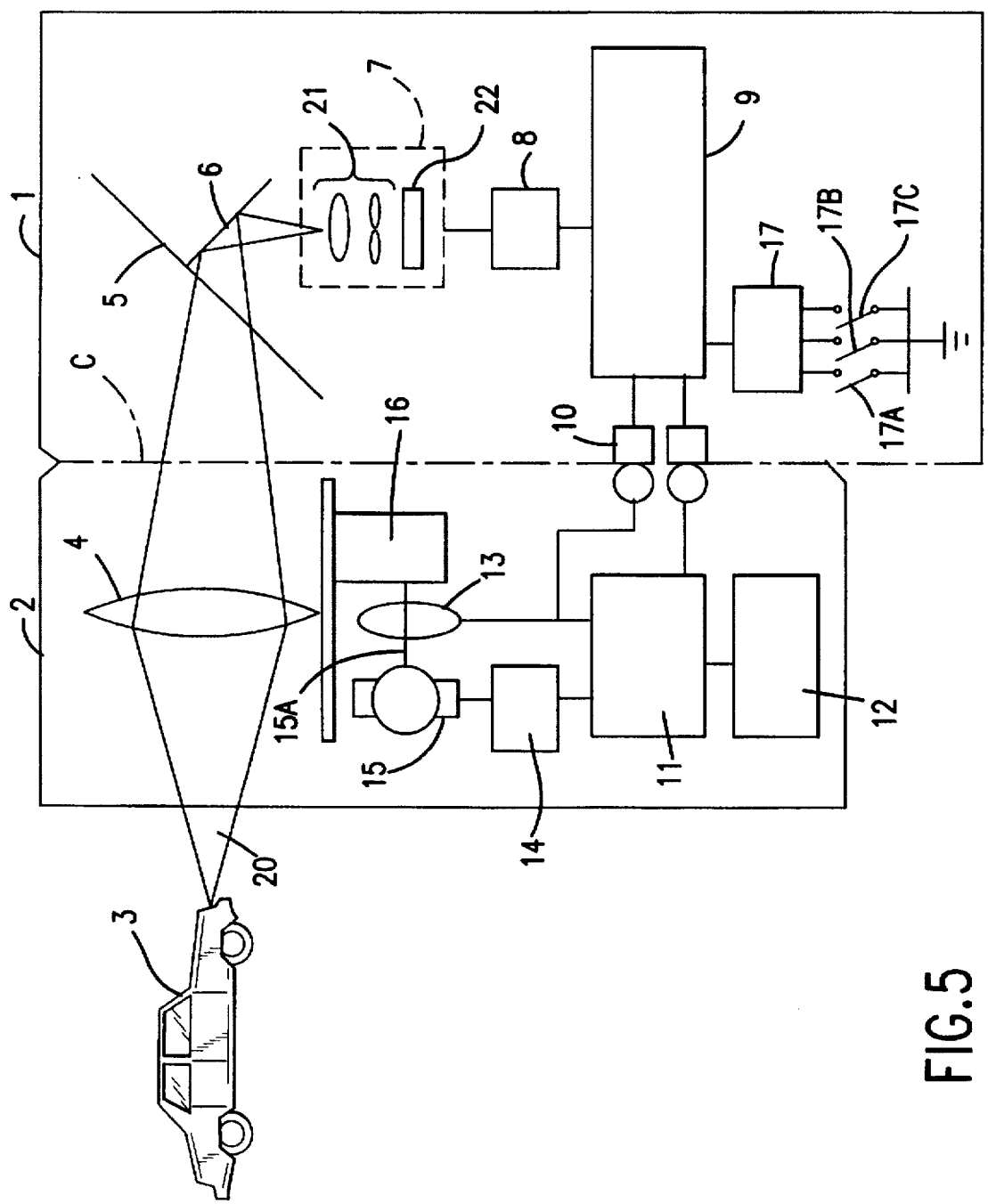
FIG. 5 is a schematic block diagram of a first embodiment a camera system of the invention.

FIG. 5 shows a preferred schematic diagram of the camera system 100 shown in FIG. 1. The camera system 100 includes the interchangeable shooting lens barrel 2 and the camera 1. The shooting lens barrel 2 and camera 1 are separable, as shown by broken line C in FIG. 5.

Light rays 20 reflecting from an object 3 pass through a phototaking or shooting lens 4 of an optical system (not shown) of the shooting lens barrel 2. The light rays 20 pass through the shooting lens 4 to an autofocus (AF) module 7, via a main mirror 5 and a sub-mirror 6 of the camera 1. The light rays 20 are converted to an electric signal in the AF module 7. The electric signals are indicative of a focussing state of the shooting lens 4.

The AF module 7 includes a re-image formation optical system 21 and a CCD sensor 22. The AF module 7 is connected to and controlled by a sensor driving circuit 8. The AF module 7 outputs a photoelectric transfer signal representative of the detected focussing state of the shooting lens 4 to a controller 9 via the sensor driving circuit 8. The AF module 7 may take any appropriate and/or conventional form, including any one of the various known focus point detection devices.

The controller 9 inputs the photoelectric transfer signal output by the AF module 7. The controller 9 converts the photoelectric transfer signal and stores the converted signal in a memory (not shown). Preferably, the memory is provided in the controller 9.

The controller 9 calculates or determines a defocus amount DF. The defocus amount DF is output to a shooting lens controller 11 of the shooting lens barrel 2 via the communication circuit 10. In the illustrated embodiments, the controllers 9 and 11 are each implemented as a single special purpose integrated circuit (e.g., ASIC) having a main or central processor section for overall, system-level control, and separate sections dedicated to performing various different specific computations, functions and other processes under control of the central processor section. It will be appreciated by those skilled in the art that the controllers 9 and 11 can also be implemented using a plurality of separate dedicated or programmable integrated or other electronic circuits or devices (e.g., hardwired electronic or logic circuits such as discrete element circuits, or programmable logic devices such as PLDs, PLAs, PALs or the like). The controller can also be implemented using a suitably programmed general purpose computer, e.g., a microprocessor, microcontroller or other processor device (CPU or MPU), either alone or in conjunction with one or more peripheral (e.g., integrated circuit) data and signal processing devices. In general, any device or assembly of devices on which a finite state machine capable of implementing the flowcharts shown in FIGS. 6, 7, 9, 11 and 13 can be used as the controllers 9 and/or 11. As shown, a distributed processing architecture is preferred for maximum data/signal processing capability and speed.

The shooting lens controller 11 controls the position of the shooting lens 4 based on the defocus amount DF output by the controller 9 and lens data stored in a shooting lens information memory 12 of the shooting lens barrel 2. The controller 11 is connected to a motor control circuit 14, which controls a drive member or motor 15. The motor 15 moves a lens moving device 16, which moves the shooting lens 4 along the optical axis of the shooting lens barrel 2.

An encoder 13 monitors the movement of the shooting lens 4 by detecting the amount of rotation of the shaft 15A of the motor 15. The encoder 13 outputs a position signal, indicative the position of the shooting lens 4 along the optical axis of the shooting lens barrel, to the controller 9 via the electrical connection 10 and to the controller 11.

A camera operational element 17, as shown on FIG. 5, includes a plurality of switches 17A-17C. The operational element 17 includes at least a first switch 17A, which starts a focus detection sequence of the camera system 100 by a first stroke of a release button (not shown) or by depressing the release button to a first position. The first switch 17A is thus referred to as "a half-depression switch". A second switch 17B, called "total-depression switch" because it is closed by fully depressing the release button to a second position, starts the exposure control sequence.

The focussing is accomplished by indicating the calculated control amount to the shooting lens, via the communications circuit. A delay amount correction circuit in the communications circuit corrects the control amount of the shooting lens control amount calculation circuit to account for any delay.

Figure 6:
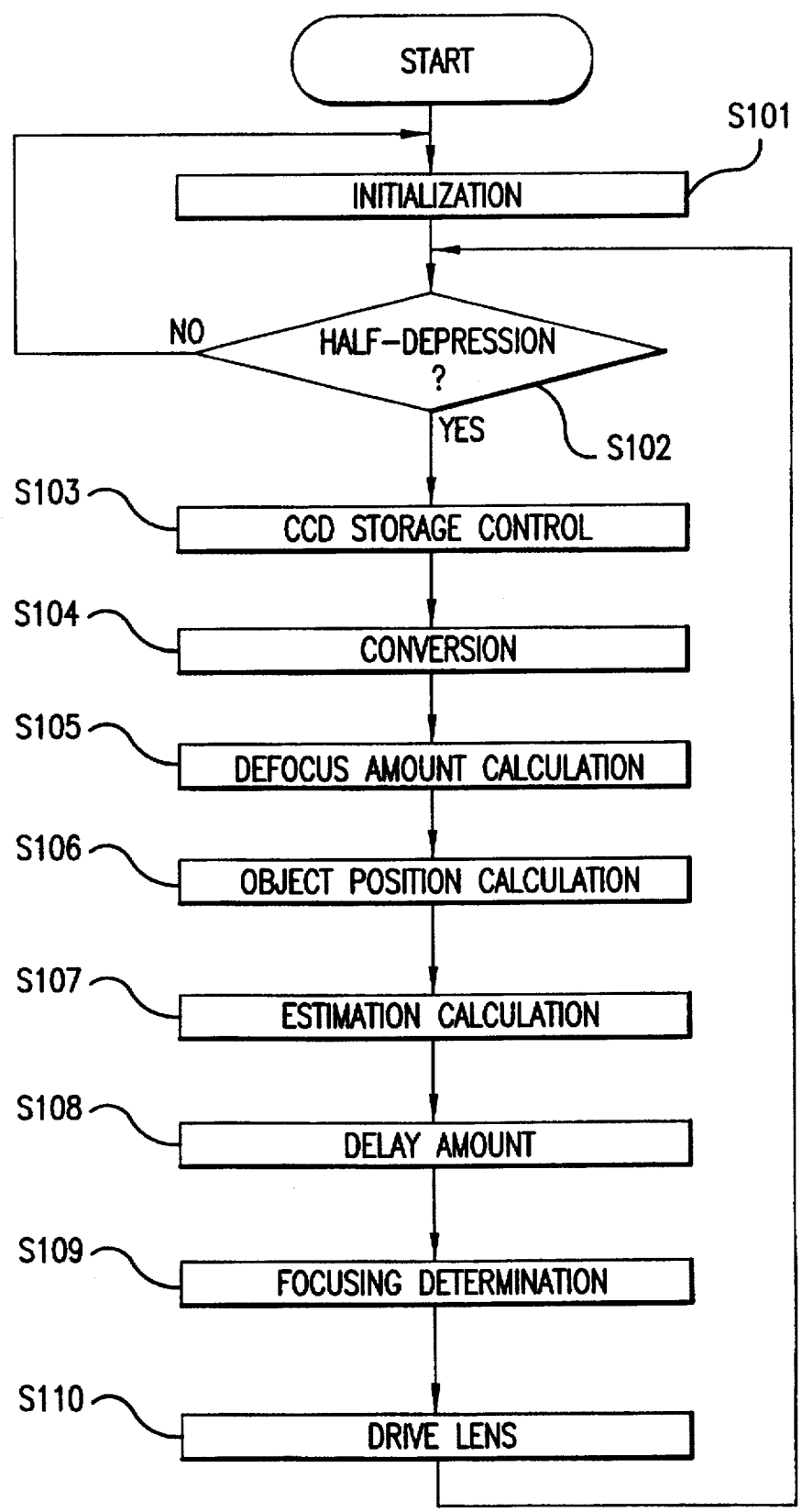
FIG. 6 is a flow chart outlining one preferred embodiment a focussing process of the first embodiment of the camera system.

A flow chart outlining one preferred embodiment of the focus detection sequence is shown in FIG. 6.

In step S101, the memory in controller 9 is initialized. For example, a past defocussing amount, a median, i.e. standard or normal accumulation time T0 for the CCD sensor 22 in the AF module 7, a moving body indicator or flag for a moving object 3, a focussing indicator or flag for a focussed shooting lens, and the like, are initialized in step S101.

In step S102, the half-depression switch 17A is checked to determine if it is "ON" (i.e. closed). If the half-depression switch is "ON", control proceeds to step S103. However, if the half-depression switch is "OFF", (i.e. open) control jumps back to step S101. Thus, if the operator of the camera is not ready to take a picture, the control simply loops through steps S101 and S102 and continues.

In step S103, the beginning and the end of an electrical load storage, or accumulation cycle or period, of the CCD sensor 22 is controlled. Furthermore, during step S103, the actual or average shooting lens position of the shooting lens 4 during storage may be calculated by monitoring positions feed-back pulses output from the encoder 13. Additionally, the shooting lens information for the CCD sensor 22 is obtained from the memory 12 via controller 11 during the accumulation period of the CCD sensor 22.

In order to calculate or determine the actual, or if the shooting lens is moving, the average shooting lens position LP0 during the accumulation period, the position feed-back pulses from the encoder 13 output during the accumulation period are counted. The average or actual shooting lens position LP0 can then be obtained. Lens communication is started at the median accumulation time T0 (TP1) in order to obtain the shooting lens information, including the defocus amount DF, a shooting lens driving amount change coefficient, F-stop value and the like, at time T0. At this point the lens sends the lens information of the lens communication starting time.

In step S104, the analog signal output by the CCD sensor 22 in the AF module 7 is converted to a digital signal. The converted digital signals are stored in a memory (not shown) by the controller 9. Then, in step S105 a defocussing amount is calculated or otherwise determined by the controller 9. Any well known and appropriate calculation process may be used by the controller 9. The current defocus amount DF0 is calculated based on the stored digital photoelectric signals from the CCD sensor 22.

Figure 8:
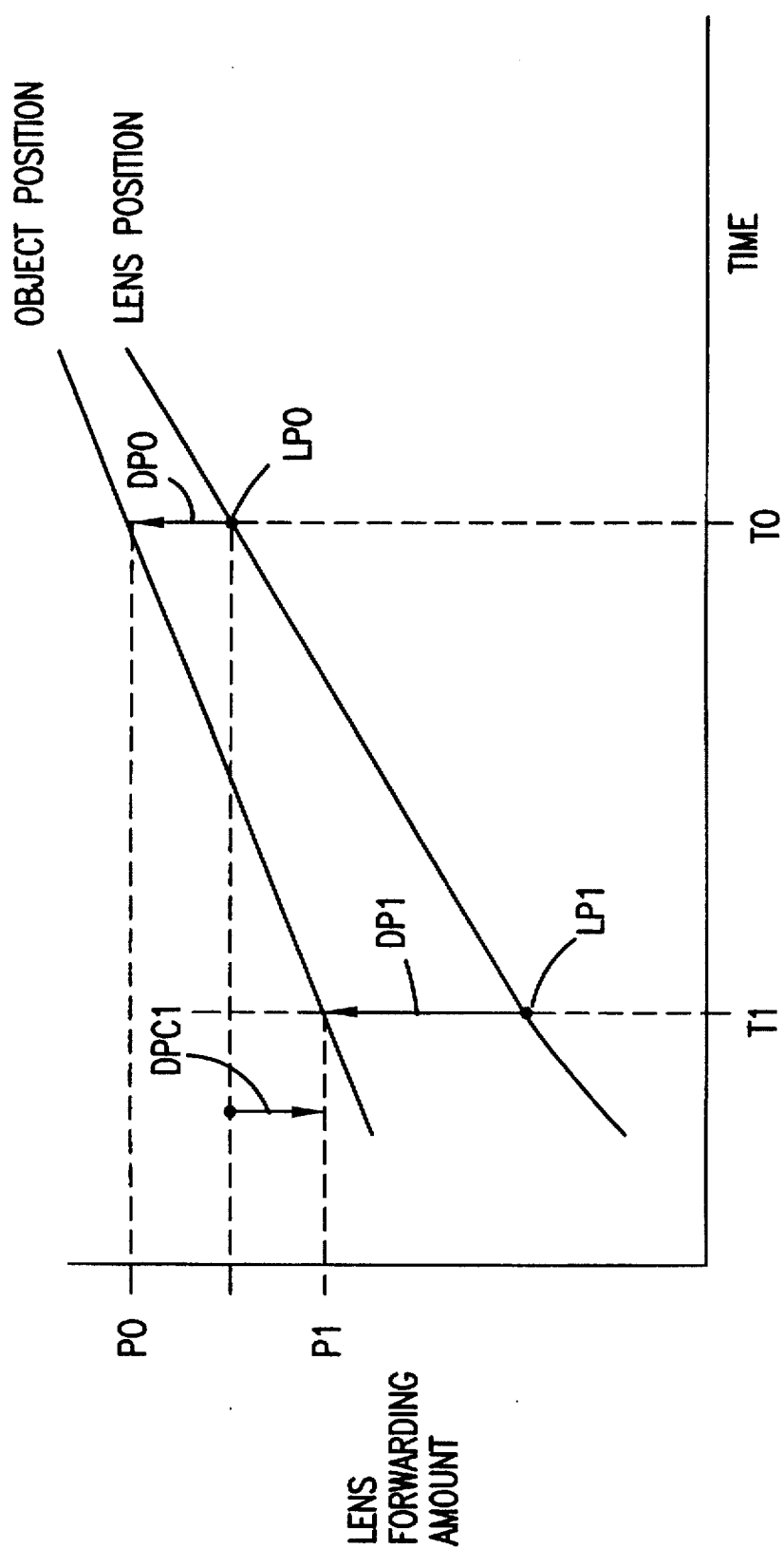
FIG. 8 graphically shows the relationship between a lens forwarding amount and time graph using a calculation method for the image plane movement speed of the first embodiment of the invention.

In step S106 an object target position P0 is calculated or otherwise determined by the controller 9. As shown in FIG. 8, the object target position P0 represents the object position at the median accumulation period T0. The focal point position of the object at the median accumulation time T0 is calculated from the current defocus amount DF0, the average or actual shooting lens position LP0, obtained at the S103, and shooting lens driving amount conversion coefficients KL and L input from the memory 12. The object target position P0 represents the position of the object at the median storage time T0. LP1 and DP1 are the shooting lens position and shooting lens movement amount at time T1, respectively.

To determine the object target position P0, defocus amount DF0 is converted to a shooting lens movement amount DP0 as set forth in Eq. (1):

$$DP0=KL*DF0/(1-L*DF0) \qquad (1)$$

where the coefficients KL and L are obtained and are obtained at the median accumulation time T0.

The object target position P0 is equal to the sum of the shooting lens movement amount DP0 and the average or actual shooting lens position LP0, as set forth in Eq (2):

$$P0=DP0+LP0 \qquad (2)$$

In step S107 the future movement of the object is estimated based on the prior focus detection information, such as the prior defocus amounts, the actual average or shooting lens positions, and the median accumulation times, which are stored.

In step S108, a delay amount DPoff is calculated by monitoring the speed control, which is based on the feedback pulses output from the encoder 13. Then, in step S109, the controller determines whether focussing has already been made and if the camera system is presently focussed. Next, in step S110, a shooting lens driving amount is determined and output to the shooting lens barrel 2. The shooting lens is, if needed, then driven in the calculated shooting lens driving amount.

Figure 7:
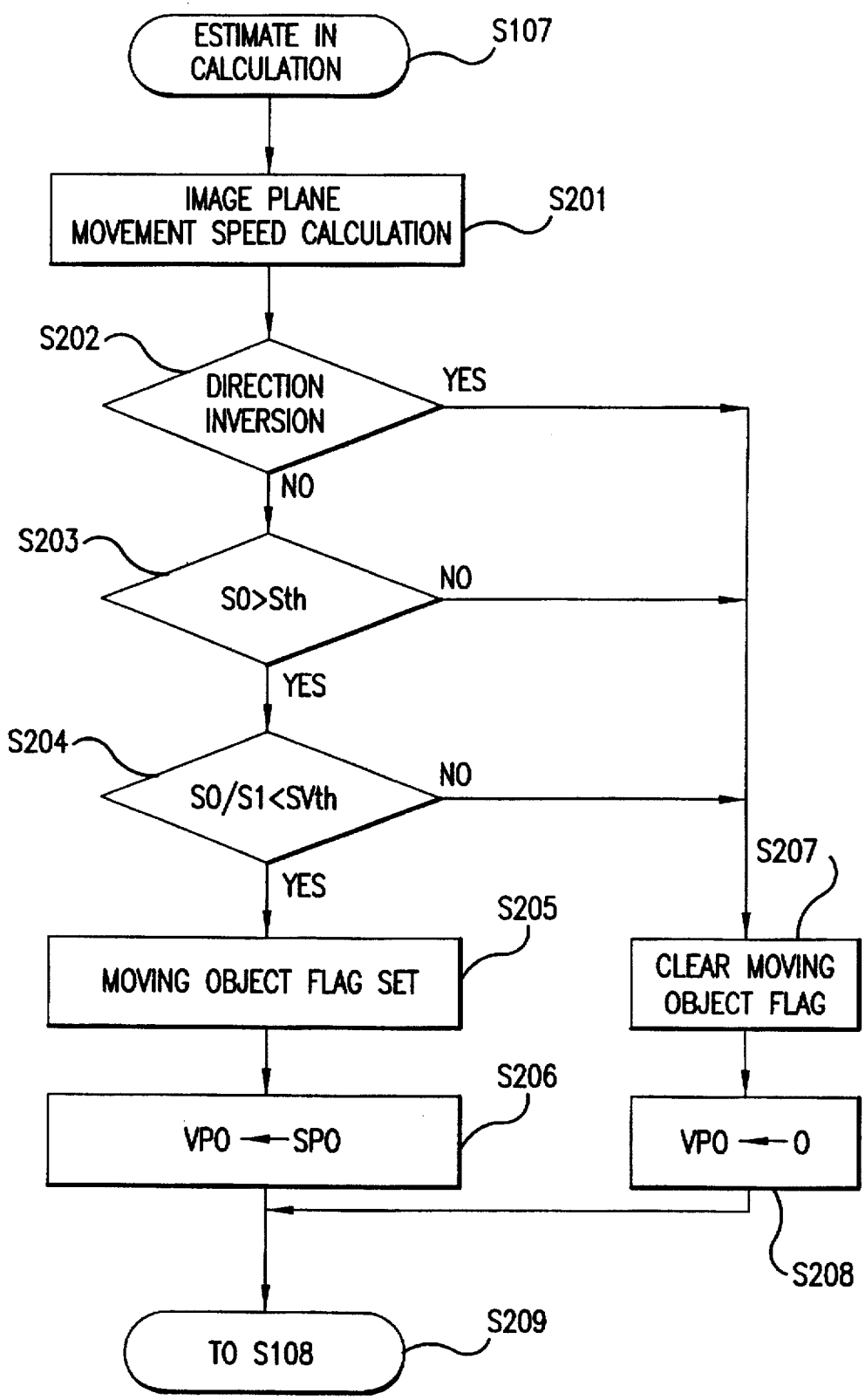
FIG. 7 is a flow chart outlining one preferred embodiment of the estimated calculation process of FIG. 6.

One preferred embodiment of the step of determining the object position of FIG. 6 is shown in FIG. 7. Starting from step S107, in step S201 an image plane movement speed S0 is calculated or otherwise determined. The image plane movement speed arises due to a moving object, and is determined when the shooting lens position is assumed to be fixed. In step S201, a shooting lens position changing speed or focus position changing speed, which is required for focussing on the object at different times and distances, is calculated or otherwise determined. The image plane movement speed is used to determine if the object is moving. The focus position changing speed is used to control the shooting lens movement.

The method for calculating the image plane movement speed S0 and the focussing position changing speed is graphically shown in FIG. 8. The defocus amount is the relative distance from the position of the current image plane to the position of the expected (i.e. focussed) image plane. This relative distance cannot be established from the changes in the defocus amount at the different shooting lens positions. Further, defocus amounts for different shooting lens positions cannot be added or subtracted.

Therefore, in order to calculate the image plane movement speed, the relative value DPC1 of the object position at a previously stored accumulation time, DPC1 with respect to the average shooting lens position for the current median accumulation time is set forth in Eq (3):

$$DPC1=P1-LP0 \qquad (3)$$

where P1 is the object target position for the previous median accumulation time. Then, the relative value DPC1 of the object position is converted to the corresponding defocussing amount DFC1, based the defocussing amount and the shooting lens driving amount conversion coefficients KL and L, as set forth in Eq. (4):

$$DFC1=DPC1/(KL+DPC1*L) \qquad (4)$$

The image plane movement speed S0 is obtained from the current defocussing amount DF0 (at the current median accumulation time T0), the defocus amount DFC1 of the previously stored median accumulation time T1, where (T0–T1) is the time for moving the required distance. The image plane movement speed S0 is calculated as set forth Eq. (5):

$$S0=(DF0-DFC1)/(T0-T1) \qquad (5)$$

The focussing position speed SP0, which is the change in the shooting lens position P0 per unit time is defined in Eq. (6):

$$SP0=(P0-P1)/(T0-T1) \qquad (6)$$

where PI is shooting lens position for focussing on the object at the previous median accumulation time T1, P0 is the object target position to be focussed on at the current median accumulation time T0, and (T0–T1) is the time for moving the required distance.

Here, the focal point detection results for current and previous median accumulation times T0 and T1 are used to calculate the image plane movement speed S0 and the focussing position speed SP0. However, it is not necessary to carry out the calculation using the current and previous median accumulation times T0 and T1. It is also possible to calculate the image plane movement speed S0 and the focussing position speed SP0 using the results from a current median accumulation time T0 and the median accumulation time (T2) prior to the immediately previous median accumulation time T1.

In step S202, the controller 9 checks whether the current object movement direction of the image plane movement speed S0, calculated at the current median accumulation time T0 is opposite to the previous object movement of the image plane movement speed S1 previously calculated. The movement direction can be inverted or in the opposite direction due to the primary object being displaced from the focus or detection area or the object merely changing the direction it is moving in. For example, the movement direction can be inverted by including a detection of another non-primary object. Also, the object movement direction can be inverted where the object is not suitable for an estimated calculation in step S107. In these cases, control groups to step S207, where the "Moving Object" flag is cleared, to indicate that the object is not recognized as moving. Otherwise, control continues to step S203.

In step S203, the controller 9 checks whether the current image plane movement speed S0 is higher than a preset threshold value Sth. If the current image plane movement speed S0 is lower than the preset threshold value Sth, the object is not recognized as moving, and control again jumps to step S207. Otherwise, control continues to step S204.

In step S204, the controller 9 calculates the ratio (S0/S1), of the previous image plane movement speed S1 and the current image plane movement speed S0. The controller then checks to determine whether the ratio S0/SI is less than a designated threshold ratio i.e., is S0/SI<SVth, where SVth is a preset threshold ratio corresponding to a reliable result. If (S0/S1) is less than SVth, control continues to step S205, and the object is considered to be moving.

If the ratio (S0/SI) is not less than the threshold ratio, i.e., (S0/SI)>SVth, the object is determined not to be within the focus or focal point detection area. Also, if the ratio (S0/S1) is not less than the threshold ratio, the program may also consider that another object has been detected. In this control advances to step S207.

In step S205, because the object is determined to be moving, at the current time T0, a "Moving Body" flag is set. Then, in step S206, a shooting lens movement target speed VP0 is set to the shooting lens movement target speed SP0 to control the shooting lens control then jumps to step S209.

As outlined above, in step S207, where the object has been determined not to be a moving object, the moving body flag is cleared. In step S208, the shooting lens movement target speed VP0 for controlling the shooting lens is set to 0.

Control then continues to step S209, which returns control to step S108.

Figure 9:
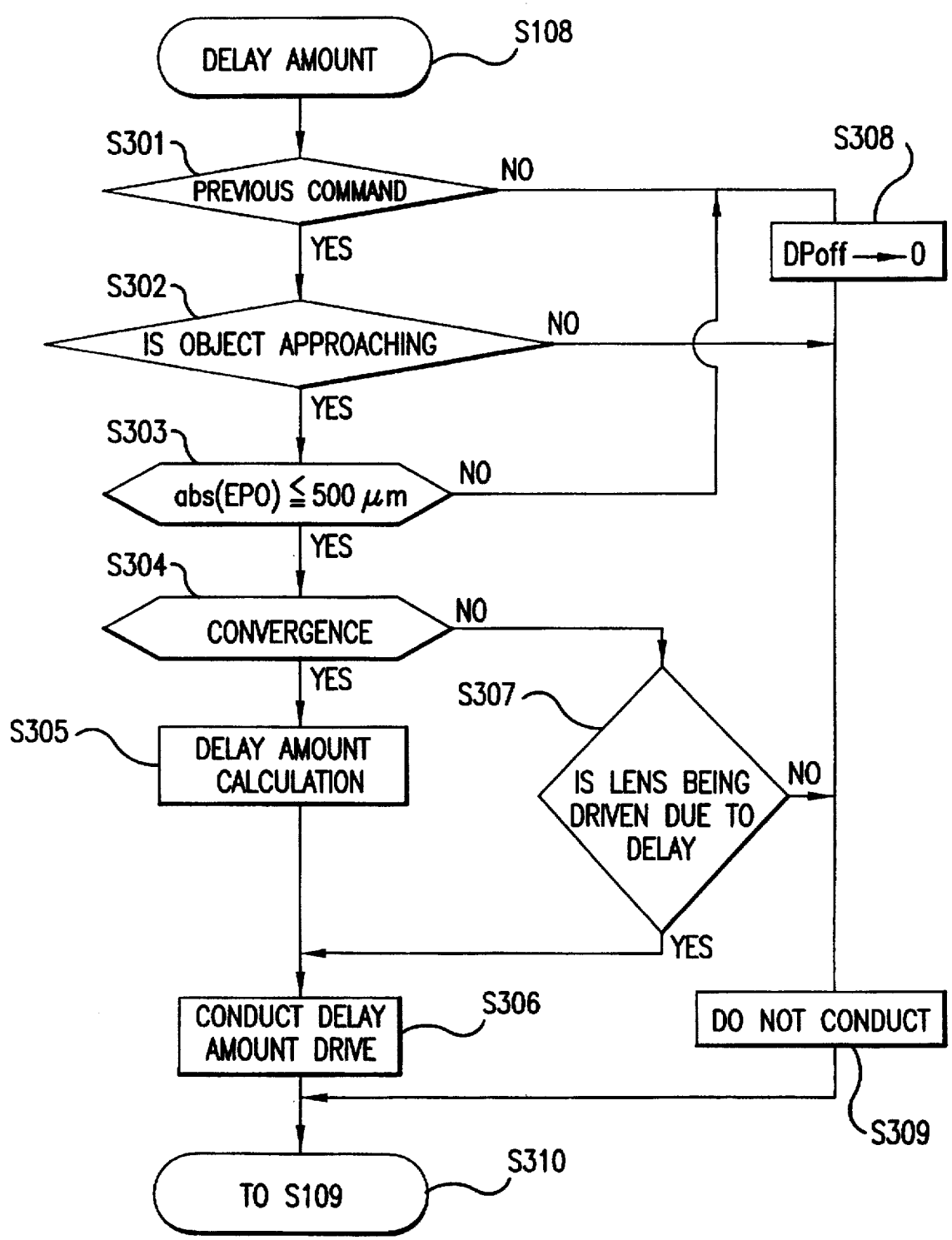
FIG. 9 is a flow chart outlining one preferred embodiment the offset measure process of FIG. 6.
Figure 10:
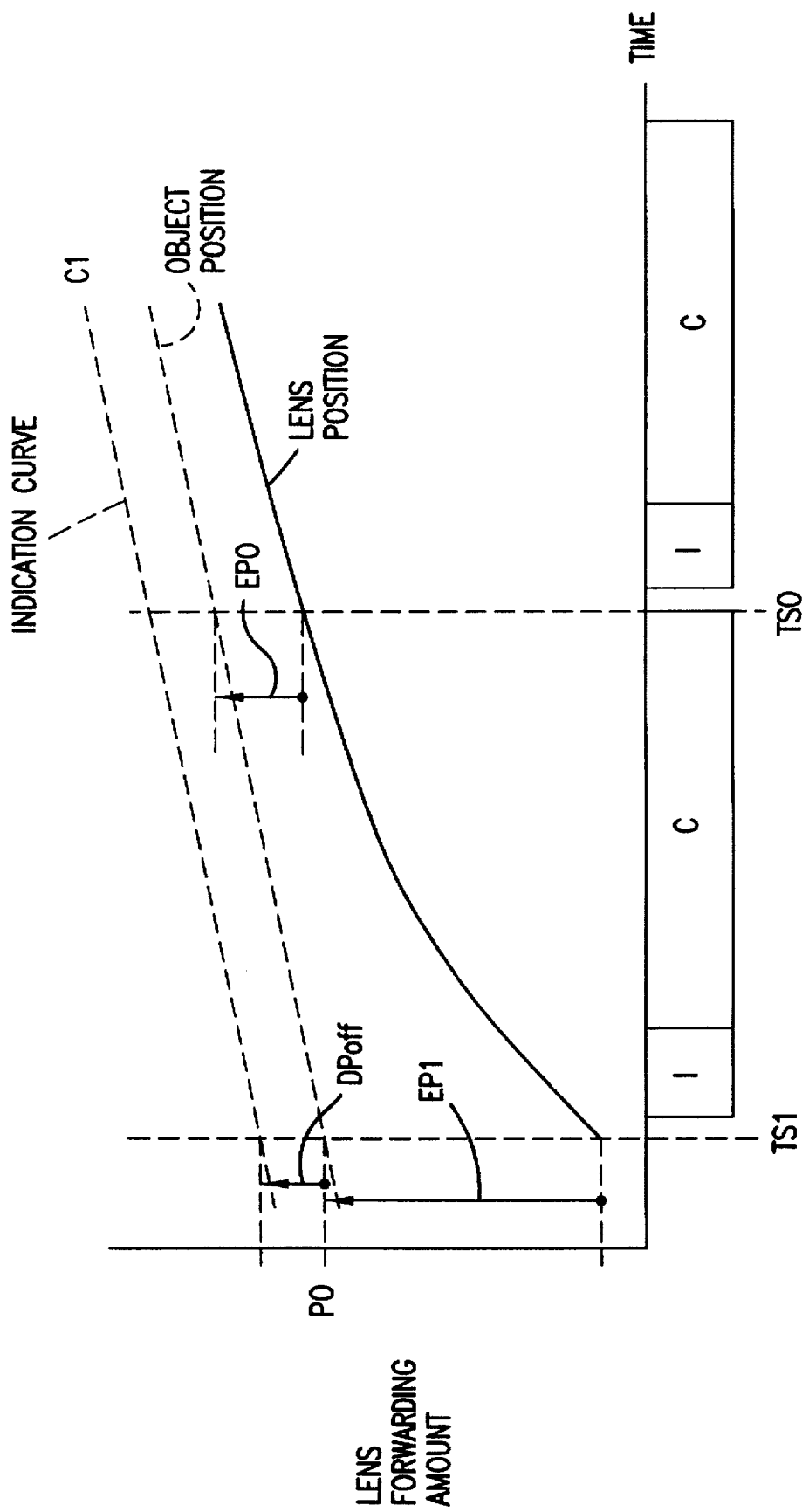
FIG. 10 graphically shows the relationship between the lens forwarding amount and time using a calculation method for the delay amount of the first embodiment of the invention.

One preferred embodiment of the step of determining the delay amount is shown in FIG. 9. In FIG. 10, "T" represents an accumulation time and "C" represents a calculation time. At time TS1, an order to drive the shooting lens 4, was sent to the shooting lens barrel 2. At time TS0, a current order to drive the shooting lens 4 is sent to the shooting lens barrel 2.

In FIG. 10, the object position curve P0 represents a locus of the moving object, as recognized by the camera system 100. The indication curve C1 indicates a control position for the shooting lens 4. The shooting lens 4 is moved such that this control position is not overshot. Therefore, the required position for focussing on the object is reached without overlapping or overshooting the object position, even if a delay has been caused. Where the shooting lens 4 is not subject to a delay, the indication curve C1 and the object position curve P0 in FIG. 10 coincide.

Figure 4:
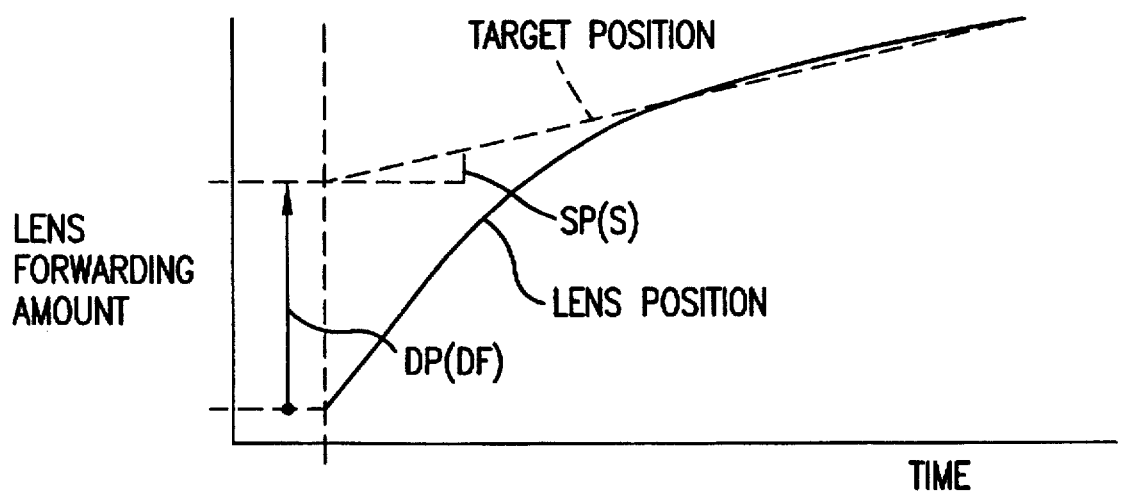
FIG. 4 graphically shows the relationship between the lens position and time using speed control.

Thus, after starting in step S108, in step S301, the controller 9 checks whether a previous speed or movement command has been given, such as in the case shown in FIG. 4. Where a previous command has not been given, a delay amount DPoff cannot be determined. Therefore, control jumps to step S308, where the delay amount DPoff is set to 0. Thus the delay amounts are not determined. Otherwise, where a previous speed or movement command has been given, control continues to step S302.

In step S302, the controller 9 checks whether the calculated image plane movement speed S0 corresponds to an approaching object with a focussing position changing speed SP0. Where the object is not approaching, it is not necessary to determine the delay amount DPoff or drive the lens. Thus, control jumps directly to step S309. Otherwise, control continues to step S303.

In step S303, the controller checks whether an absolute value of the difference EP0 between the current shooting lens position LP0 and the object target position P0 is less than 500 µm. If the shooting lens position LP0 is not this close to the object target position P0, i.e., the absolute value of EP0 is greater than 500 µm, the delay amount DPoff cannot be accurately determined. Therefore, control jumps to step S308 and the delay amount DPoff is set to 0. Control then continues then proceeds to S309, where, because the delay amounts DPoff is not determined, lens driving is not conducted. Otherwise, control continues to step S304.

In step S304, the controller 9 checks whether a convergence driving state is currently achieved. The convergence driving state is a state where the indicated speed VP0 and the actual shooting lens speed SP0 are approximately equal. This is shown in FIG. 10, where the indication curve C1 and the shooting lens position curve P0 are substantially parallel. The convergence driving state is determined as follows:

1) the absolute value of the difference between the shooting lens speed SP0 at the present time TS0 and the indicated speed P0 at the previous time TS1 is determined to be less than a preset designated value; and 2) the absolute value of the difference between the average shooting lens speed from time TS1 to time TS0, and the indicated speed VP0 is determined to be less than the preset designated value.

If the delay amount DPoff can be calculated, because the convergence driving state is determined to be reached, control continues to step S305, where the delay amount DPoff is calculated.

If, in step S304, the convergence driving state has not been reached, it is not clear whether a delay has been currently created. Moreover, the delay amount will not be clear. Therefore, control jumps to step S307, where the controller 9 checks whether lens driving, due to a delay amount DPoff, is presently being conducted. If so, control jumps to step S306, otherwise, control jumps to step S309. Where lens driving has been accomplished and a large delay amount DPoff has been corrected, the convergence driving state may momentarily be lost. Further, where previous lens driving due to a delay amount has been accomplished, even if the shooting lens 4 is not presently in the convergence driving state, the lens driving due to a delay amount DPoff is accomplished based on the delay amount DPoff previously obtained, without recalculating a delay amount DPoff.

In step S305, when there is perfect convergence at the current time TS0, as shown in the FIG. 10, the delay amount DPoff can be calculated, as set forth in Eq. (7):

$$DPoff=DPoffO+EP0 \quad (7)$$

where DPoffO is the previously calculated delay amount, and EP0 is a delay amount not yet updated by a previous expected delay amount DPoff. The expected delay amount DPoff is determined as set forth in Eq. 8:

$$DPoff=DPoff0+\beta*(EP0-\alpha*(EP1-EP0)) \quad (8)$$

where $\alpha$ and $\beta$ are constants between 0 and 1. Control then continues to step S306.

In step S306, a flag is set to indicate that lens driving due to a delay amount DPoff is being performed. Control then continues to step S310, which returns control to step S109.

Figure 11:
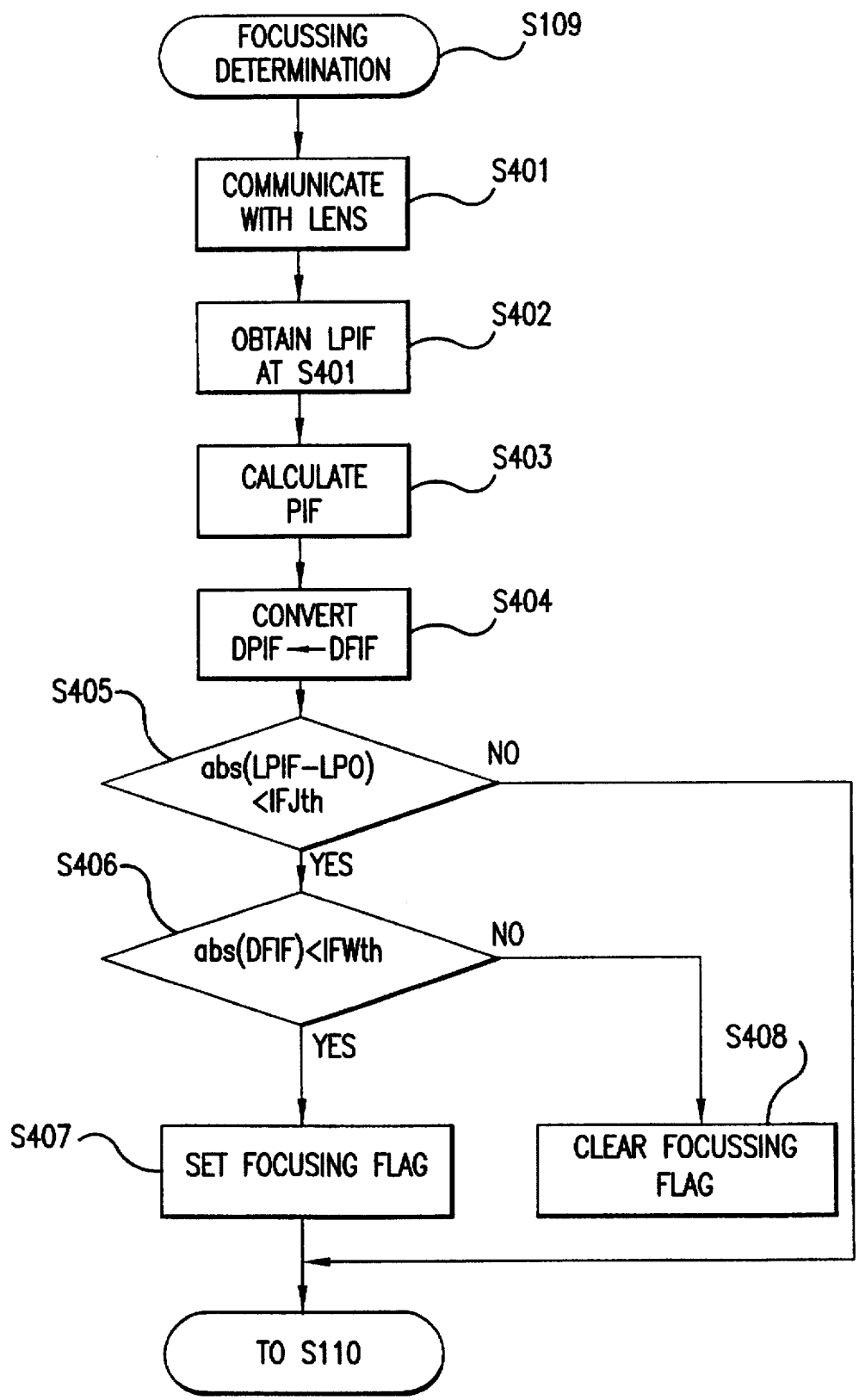
FIG. 11 is a flow chart outlining one preferred embodiment of the focal point determination process of FIG. 6.
Figure 12:
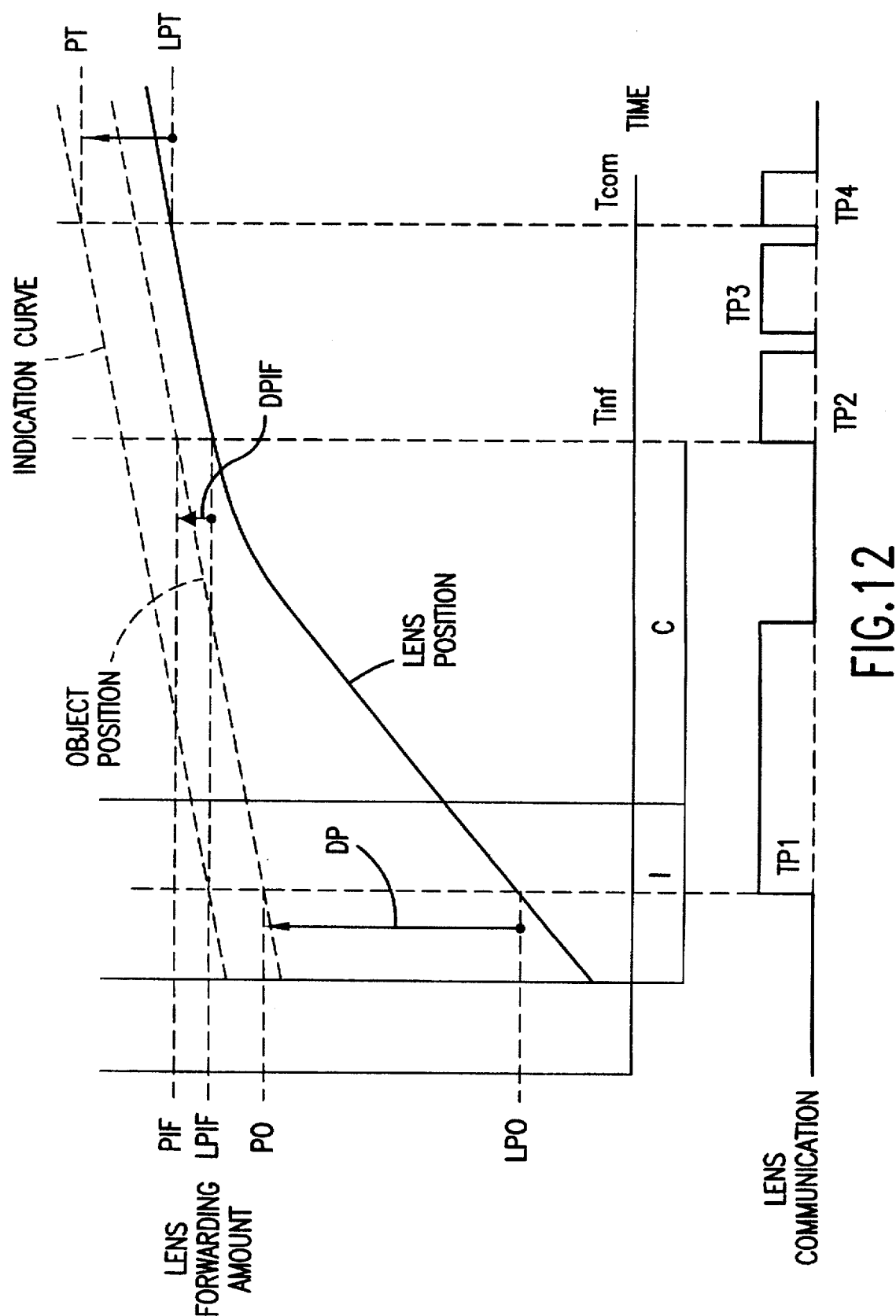
FIG. 12 graphically shows the relationship between the lens forwarding amount and time using a focal point process of the first embodiment of the invention.

FIG. 11 shows the sub-routine S109 for the focussing determination. FIG. 12 shows a graph explaining the calculation of the current defocussing amount, DFIF. TP represents a time for the exchange of data by the shooting lens communicating with the camera. "T" represents the storage or accumulation period cycle of the photoelectric conversion element, preferably a CCD sensor. "C" represents the focal point detection calculation time. TP1–TP4 represent time periods of lens communication. "LPT" represents the lens position at the start of communication Tcom.

In step S401, a defocussing amount shooting lens movement amount conversion coefficient is obtained to calculate the defocus amount. This coefficient is needed because the defocussing amount shooting lens movement amount conversion coefficient changes with the position of the shooting lens 4.

In step S402, the shooting lens position LPIF is obtained for step S401. The shooting lens position LPIF is used to calculate the defocus amount DFIF.

In step S403, calculated the object position PIF is calculated for step S401. The object position PIF is determined as set forth in Eq. (9).

$$PIF=VP0*(Tinf-T0)+P0 \quad (9)$$

where Tinf represents the start time of step S401. In step S404, a remaining drive amount DPIF when focussing is determined is calculated as using Eq. (10).

$$DPIF=PIF-LPIF \quad (10)$$

The defocus amount DFIF, used to determine focussing, is calculated according to Eq. (11). Eq. (11) using the remaining drive amount DPIF at step S401.

$$DFIF=DPIF/(KL+DPIF*L) \quad (11)$$

In step S405, the control checks whether the absolute value of the shooting lens movement amount, from the storage time to focussing determination time, is less than a preset or predetermined designated value IFJth, using Eq. (12).

$$|LPIF-LP0|<IFJth \quad (12)$$

When the shooting lens movement amount is larger than IFJth, a mistake, perhaps due to a calculation error may have been made in determining the amount for focussing. Therefore, focussing does not occur.

In step S406, the control determines whether the defocus amount DFIF is within focussing width or range, IFWth. Where the defocus amount DFIF is within the focussing width IFWth, the control advances to step S407. A flag is then set in step S407 to indicate the focussing is achieved or being made. Where the defocus amount PFIF is over the focussing width or range IFWth, the control advances to S408 and clears any flag indicating focussing.

Figure 13:
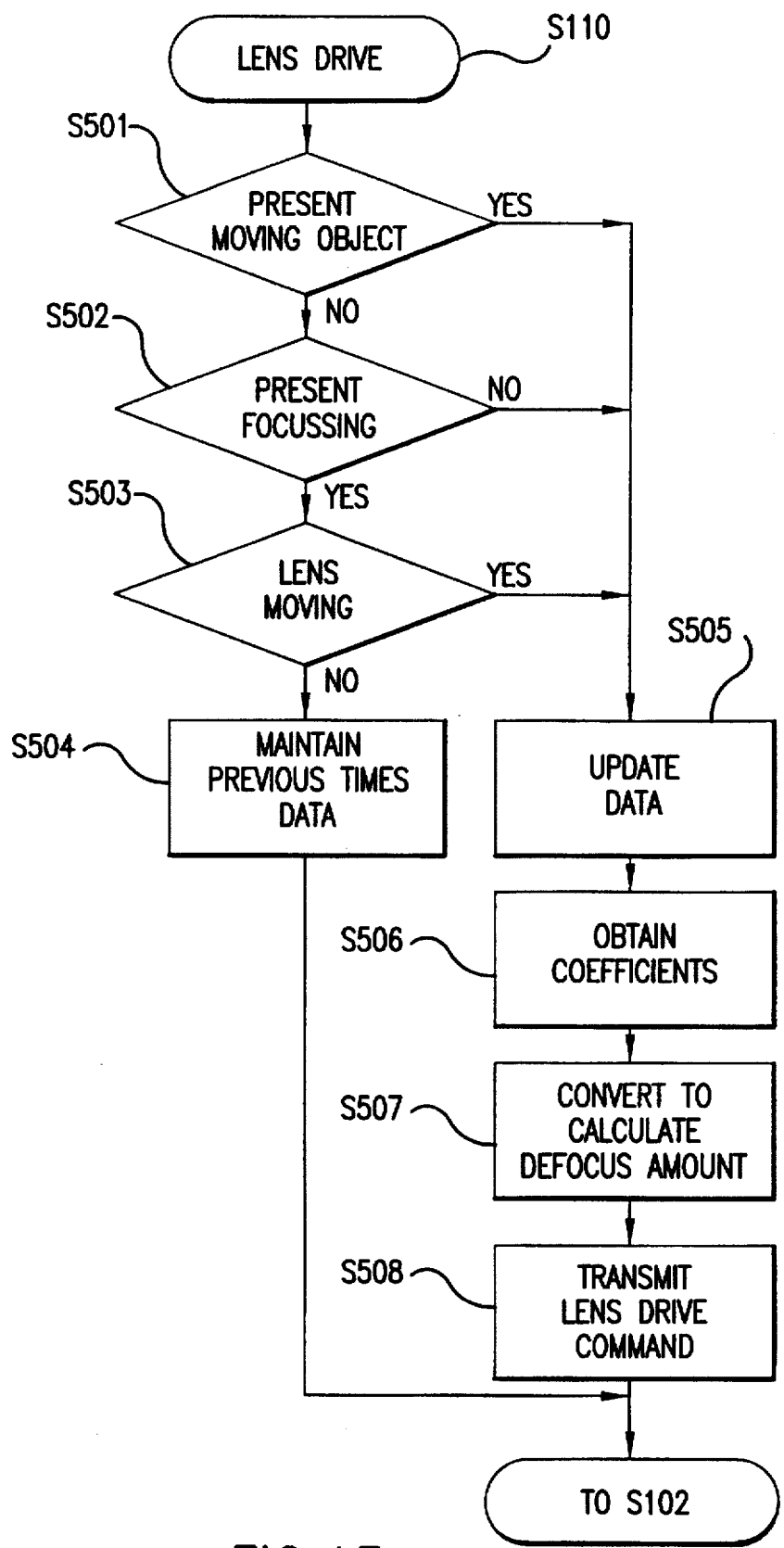
FIG. 13 is a flow chart outlining one preferred embodiment of the shooting lens driving process of FIG. 6.

The control for shooting lens driving is now explained with reference to FIG. 13. In step S501, the control determines whether the object is currently moving, by referencing a preset "Moving Object" flag (S205). Where the object is moving, any movement of the shooting lens 4 is not stopped by the focussing determination. The calculated current driving target data, including the current object target position P0 and the current shooting lens movement target speed, will be updated.

Where the object is not currently moving, the control in step S502 determines whether a focussing operation has previously been conducted. If there has not been a previous focussing operation, the current driving target data is updated. If it has been determined that a focussing operation has been conducted, the control program advances to step S503.

In step S503, the control determines whether the shooting lens 4 is presently being driven or moved. Where the shooting lens 4 is being moved, the calculated driving target data is updated. If the shooting lens 4 is being moved or being driven, it is driven until the defocussing amount becomes 0 without stopping, even if the shooting lens 4 comes into focus.

Where the shooting lens 4 is not being moved, a new shooting lens moving or driving operation will not be conducted. Therefore, the driving target data is not updated and the previous driving target data is maintained in step S504. Therefore, the control returns to the shooting lens driving sub-routine S110, without driving the shooting lens 4.

In step S505, the control updates the driving target data for the current time. In step S506, the defocussing amount is sent to the shooting lens.

In step S507, a driving defocussing amount PT for the present shooting lens position P0 is calculated, using Eq. (17), the defocussing amount and the shooting lens movement conversion coefficient.

$$PT=VP0*(Tcom-T0)+P0+DPoff \quad (13)$$

where Tcom represents the time at the start of communication.

In step S507, the remaining driving amount DPT to control the shooting lens driving is calculated using Eq. (14).

$$DPT=PT-LPIF \quad (14)$$

The defocussing amount DFT used in focussing is calculated from the remaining driving amount DPT, at the start of the communication, the defocussing amount and the shooting lens driving amount conversion coefficient, using Eq. (15).

$$DFT=DPT/(KL+DPT*L) \quad (15)$$

In step S508, the calculated defocussing amount DFT and the image plane speed S0 are sent to the shooting lens 4. The shooting lens 4 is moved based on the updated and calculated defocussing amounts and the image plane speed sent in S508.

The coefficients $\alpha$ and $\beta$ used to calculate of the delay amount DPoff in the first preferred embodiment are constant, and are thus independent of times TS1 and TS0. The convergence state can thus be reached as the time between TS1 and TS0 becomes longer.

Figure 14:
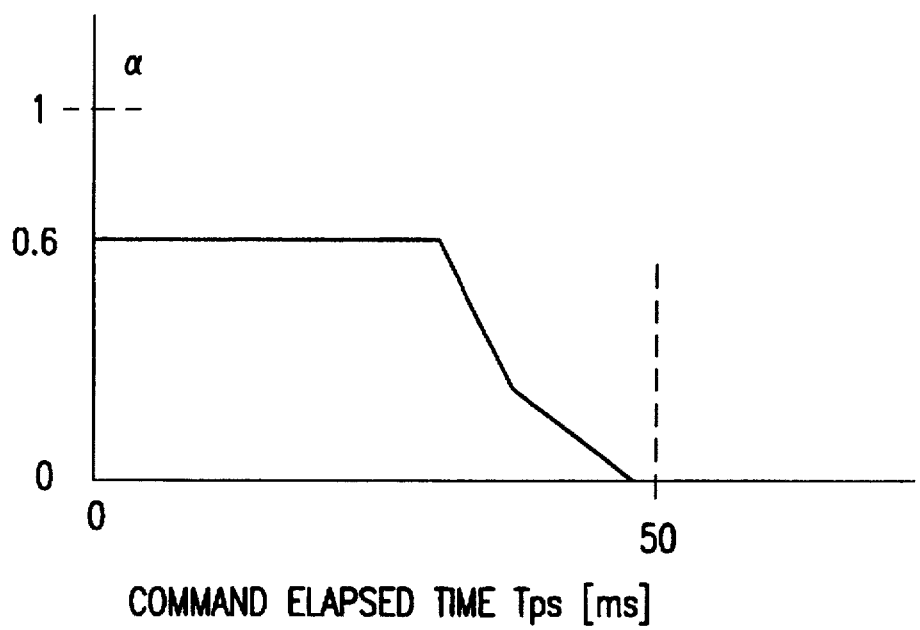
FIG. 14 graphically shows changes in α as a function of time in a second embodiment of the invention.
Figure 15:
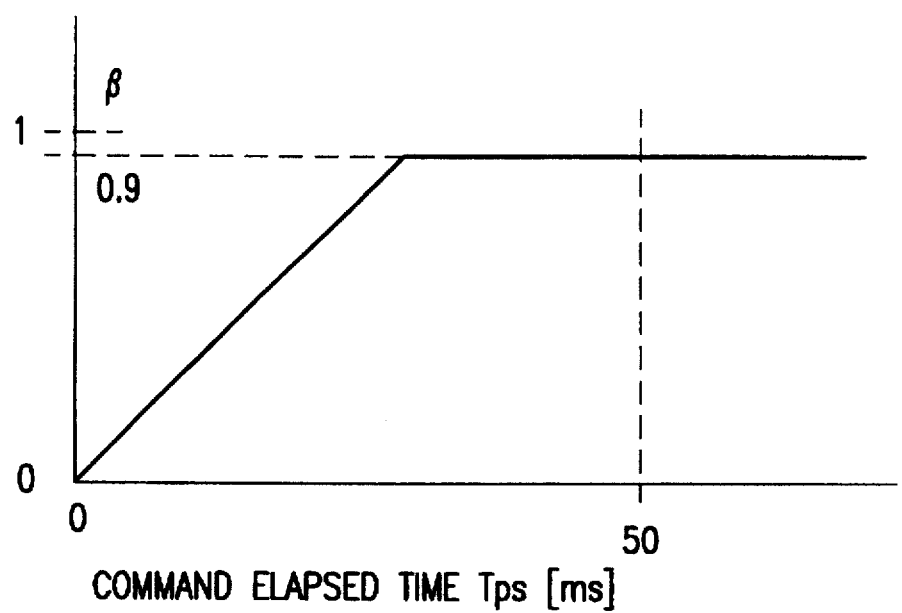
FIG. 15 graphically shows changes in β as a function of time in the second embodiment of the invention.

The coefficients $\alpha$ and $\beta$ can be changed in accordance with the command elapsed time Tps according to a second preferred embodiment of this invention. The relationships of coefficients $\alpha$ and $\beta$ are shown in FIGS. 14 and 15, respectively. As the command elapsed time Tps increases, the convergence state gets closer. Therefore, $\alpha$ is 0 and $\beta$ is 1, since a current delay amount DPoff can be used. However, because the shooting lens position P0 does not converge in a clean straight line, as shown in the FIG. 4, β is therefore 0.9.

The time periods used to calculate the delay amount DPoff in the first and second embodiments are the same for the focal point detection. However, it is not necessarily required that these periods be the same. In the case of low luminance objects, it takes time to calculate the delay amount DPoff, especially if the calculation is dependent on a focal point detection period. This method for calculating the delay amount DPoff using a designated period, instead of a presently determined period, takes less time and is clearly better than conventional methods.

In this invention, the delay amount DPoff is calculated and the results are constantly fed back. However, if focus detection is accomplished for the shooting lens 4 and a small delay amount DPoff is discovered, the control amount can be increased. As a result, unstable factors increase. Therefore, lens driving due to delay amounts DPoff are not necessary in a shooting lens 4 that has a small amount of delay.

Figure 2:
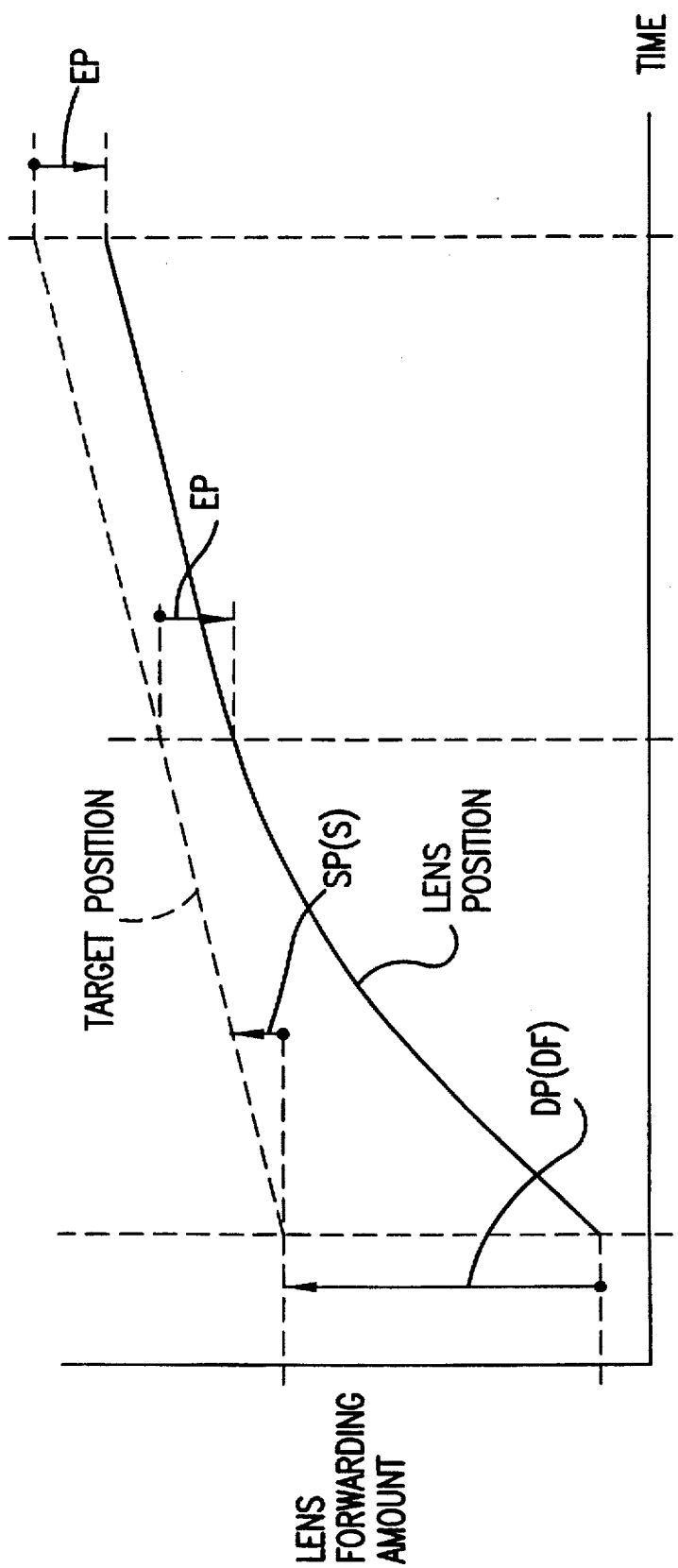
FIG. 2 graphically shows the relationship between lens position and time using the prior art control.
Figure 3:
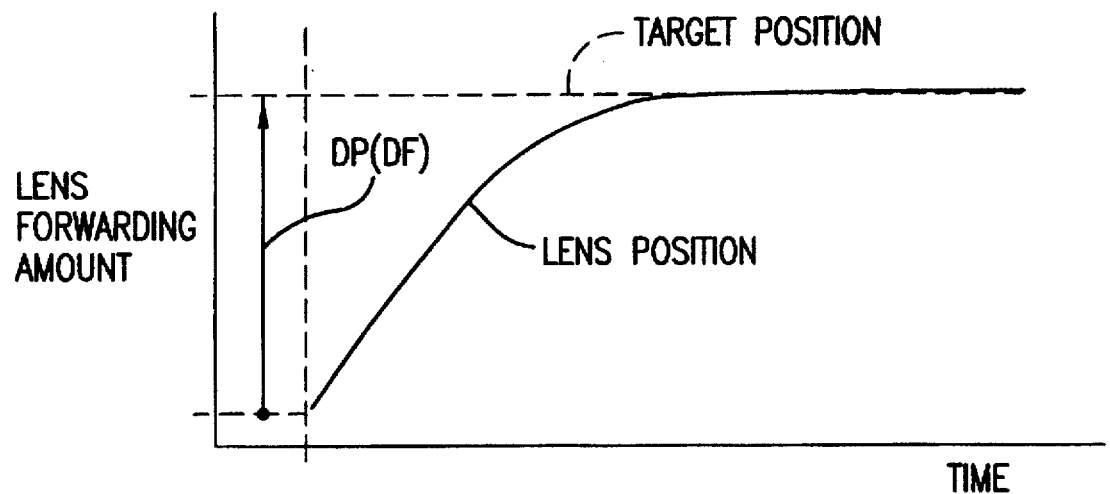
FIG. 3 graphically shows the relationship between the lens position and time graph using position control.

According to the first and second embodiments, a monitoring circuit monitors the movement of the shooting lens 4. The delay amount DPoff, as shown in FIG. 2, is calculated, and a corrected movement amount, found by adding the delay amount ER to the movement amount DP, is communicated to the shooting lens barrel 2.

While the invention has been described in conjunction with the specific embodiments described above, it is evident that many alternatives, modifications and variations will be apparent to those skilled in the art. Accordingly, the preferred embodiments of the invention as set forth above are intended to be illustrative rather than limiting. Various changes may be made without departing from the spirit and scope of the invention as defined in the following claims.

What is claimed is:

1. A camera system comprising:
   a camera, shooting lens barrel, focus detection device for detecting a desired focussing position of the shooting lens for an object, and communication circuit,
   the shooting lens barrel, comprising:
      a shooting lens;
      a shooting lens driving circuit that moves the shooting lens to focus on the object;
      a shooting lens driving control circuit that controls the shooting lens driving circuit;
      a shooting lens data memory circuit that stores focussing data; and
   the camera comprising:
      a focal point detection circuit that detects when the focussing position of the shooting lens matches a desired focussing position;
      monitoring circuit that monitors the shooting lens movement by the shooting lens driving circuit, and outputs a focussing position of the shooting lens; and
      a shooting lens control amount calculation circuit that calculates a control amount for driving the shooting lens to the desired focussing position, based on an output of the focal point detection circuit and the focussing position output by the monitoring circuit; and
   a delay amount correction circuit that updates the control amount of the shooting lens control amount calculation circuit to an updated control amount to correct an actual delay amount based on a delay in calculating the shooting lens control amount;
   a communications circuit, the communications circuit connecting circuits of the shooting lens barrel to communicate with said circuits of the camera;
   wherein focussing of the shooting lens is accomplished by transmitting the updated control amount to the shooting lens barrel and moving the shooting lens to the desired focussing position based on the updated control amount.

2. The camera system according to claim 1, wherein the control amount is determined based on a defocus amount stored in the shooting lens data memory and an image moving speed.

3. The camera system according to claim 1, wherein the control amount is based on a movement amount stored in the shooting lens data memory and a movement amount change amount.

4. The camera system according to claim 1, wherein the delay amount correction circuit corrects the delay amount every time a control amount is calculated.

5. The camera system according to claim 1, further including a delay amount correction prevention circuit that disables operation of the delay amount correction circuit.

6. A camera system comprising:
   a camera, shooting lens barrel, focus detection device, for detecting a desired focussing position of the device, for detecting a desired focussing position of the shooting lens for an object, and communication circuit,
   the shooting lens barrel comprising a shooting lens;
      means for moving the shooting lens to focus on the object;
      means for controlling the moving means; and
      means for storing focussing data;
   the camera comprising:
      means for detecting when the focussing position of the shooting lens matches a desired focussing position;
      means for monitoring the shooting lens movement by the moving means and outputting a focussing position of the shooting lens; and
      means for calculating a control amount for driving the shooting lens to the desired focussing position, based on an output of the means for detecting when the focussing position the shooting lens matches the desired focussing position and the shooting lens movement output by the means for monitoring; and
   means for updating the control amount of the means for calculating to an updated control amount based on an actual delay in calculating the shooting lens control amount;
   interconnecting means for permitting communication between the means of the shooting lens to communicate with means of the camera, and
   wherein focussing of the shooting lens is accomplished by transmitting the updated control amount to the shooting lens barrel and moving the shooting lens to the desired focussing position based on the updated control amount.

7. The camera system according to claim 6, wherein the control amount is determined based on a defocus amount stored in the means for storing.

8. The camera system according to claim 6, wherein the control amount includes the amount of movement stored in the means for storing.

9. The camera system according to claim 6, wherein the means for calculating corrects the delay amount every time a control amount is calculated.

10. The camera system according to claim 6, further including means for disabling the operation of the updating means.

11. A method for focussing a camera system, the camera system including a camera, a shooting lens, a focus detection device for detecting a desired focussing position of the shooting lens for an object to be photographed, and a communication circuit, the camera system focussing method including the steps of:

storing data concerning the camera system;

moving the shooting lens to the desired focussing position focus on the object;

controlling the moving of the shooting lens;

detecting when a focussing position of the shooting lens matches the desired focussing position;

monitoring the focussing position of the shooting lens;

calculating a control amount to drive the shooting lens to the desired focussing state, the control amount based on when the focussing position of the shooting lens matches the desired focussing position and the monitored focussing position of the shooting lens;

determining an actual delay amount;

updating the control amount of the shooting lens control amount based on the actualdelay amount; and focussing the shooting lens by transmitting the updated control amount to the shooting lens and moving the shooting lens in accordance with the updated control amount.

12. The method according to claim 11, further including the step of calculating the actual delay amount every time a control amount is calculated.

13. The method to claim 11, further including the step of preventing the step of the updating.

* * * * *